United States Patent [19]
Durand

[11] Patent Number: 5,806,577
[45] Date of Patent: Sep. 15, 1998

[54] BEARING GUIDE FOR ROUTER BIT

[76] Inventor: Greg Durand, 251 Beacon Ct. Unit #8, Grand Junction, Colo. 81503

[21] Appl. No.: 826,356

[22] Filed: Mar. 26, 1997

Related U.S. Application Data

[60] Provisional application No. 60/

[51] Int. Cl.⁶ .............................. B27D 1/12; B23C 5/14; B27C 5/00
[52] U.S. Cl. .................. 144/142; 144/134.1; 144/144.5; 144/145.3; 144/371; 407/34
[58] Field of Search .............................. 144/134.1, 135.2, 144/136.95, 142, 145.1, 144.1, 371; 409/124, 126, 125, 130; 407/1, 2, 30, 34

[56] References Cited

U.S. PATENT DOCUMENTS

| | | | |
|---|---|---|---|
| 4,669,923 | 6/1987 | McKinney | 144/371 X |
| 5,647,700 | 7/1997 | Velepec | 144/134.1 X |

*Primary Examiner*—W. Donald Bray
*Attorney, Agent, or Firm*—Jane Parsons

[57] ABSTRACT

A router bit has a bearing guide which does not rotate with the bit. The router bit has a downwardly directed axial tip which engages and rotates in a bearing socket of a bearing guide plate having a straight edge to abut the work being cut. Because the guide does note rotate with the router bit there may be less danger of the guide gouging or marking the work.

5 Claims, 1 Drawing Sheet

BEARING GUIDE FOR ROUTER BIT

BACKGROUND OF THE INVENTION

This application claims benefit to USC 119(e) of any U.S. Provisional application Ser. No. 60/014,402, filed Mar. 29, 1996.

1. Field of the Invention

The present invention relates to bearing guides for use with self guiding router bits.

2. Acknowledgement of Prior Art

Router bits are used in carpentry to cut articles and profile, for example, to cut the edge of a wooden article to curve it vertically, or provide a horizontally ridged profile about the edge of an article, or to make a pattern in the surface of an article. In order to guide the router bit along a predetermined path to maintain the curve or ridges of the edge of the article regular and even, a guide is provided to follow the edge of the article and to maintain the blade of the bit at the same distance from the edge as the bit travels along the edge. Conventionally, such guides may comprise a disc having a central bearing for an axial beaming tip of the bit. The radius of the disc determines the distance of the cutting blade of the bit from the article. In practice a circumferential edge of the disc travels along the edge of the article to be cut. Because the disc is circular it may be rolled over the edge of the article to be cut.

In some less expensive router bits the guide is integral with the bit and rotates over the edge of the article to be cut at the same speed as the bit itself. These less expensive router bits will not be particularly considered since it is clear that a guide rotating at the same speed as the bit itself may damage the edge of the article to be cut.

In fact, even circular bearing guides which roll over the edge to be cut at a much slower speed than the rate of rotation of the router bit may leave a bearing imprint along the entire edge of the wood being profiled. Such a bearing imprint may result in an inaccurate cut profile and a time consuming job is necessary to sand out this imprint. Sanding is, itself, undesirable since it leaves a blurred finish on the wood. It is generally believed that a clean cut, unsanded surface is better that a sanded surface for any final waxing and finishing treatments to be applied. The present inventor has addressed the problem of providing a bearing guide for a router bit which minimizes any marking of the edge to be cut and allows accuracy in cut profile.

SUMMARY OF THE INVENTION

Accordingly the invention provides a router bit having a bearing guide, the bearing guide comprising a plate having a straight edge for location against an article to be cut by the router bit and having a bearing for the router bit in a surface thereof, the bearing being spaced from the straight edge by a distance to locate the router bit in a desired cutting position, and the router bit having an axial tip locatable in the bearing.

The straight edge of the guide should merge smoothly with the remaining periphery of the guide, i.e. there should be no sharp corners between the straight edge and the rest of the periphery. Any such sharp corners might present a risk of damaging the article to be profiled.

The bearing guide plate should be of a thickness sufficient to allow it to travel along the article to be cut without leaving marks of its travel on the article. This thickness will vary in dependence upon the size and type of the profile to be cut in the article. For example, if a large complex profile is to be cut, considerable pressure must be exerted against the article and a guide plate of greater thickness will be required than for a simple delicate cut. In any event, it may be preferable that the thickness of the guide plate be at least 5 mm.

The length of the straight edge may also vary. It should be sufficient to absorb pressure between the article to be cut and the bearing guide without leaving a bearing imprint on the article. It should also be sufficient to bridge small gaps and imperfections along the edge to be profiled. Probably the straight edge should be at least 25 mm.

Conveniently the bearing guide is a rectangular plate having a central bearing. Parallel long edges of the rectangular plate may alternately act as straight edges of the guide and short edges of the rectangular plate are of a diameter equalling the diameter of the bearing guide. Thus the rectangular bearing plate may be used with either long edge acting as the straight guide edge without altering the cutter depth or profile.

BRIEF DESCRIPTION OF THE DRAWINGS

Embodiments of the invention are described by way of example with reference to the accompanying drawings in which.

DETAILED DESCRIPTION OF A PREFERRED EMBODIMENT

Figure 1:
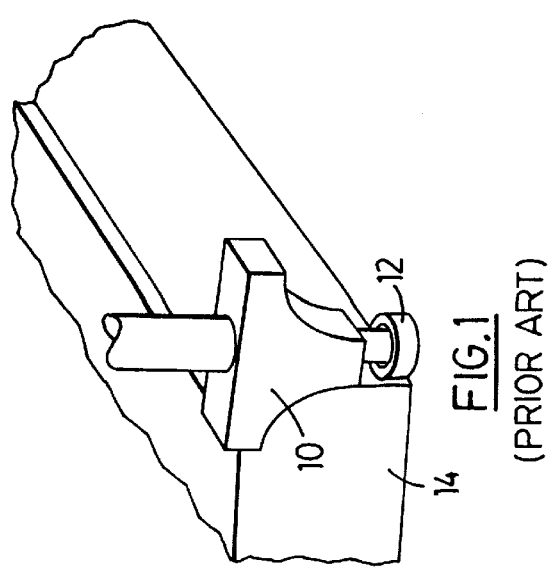
FIG. 1 shows a router blade having a conventional bearing guide according to the prior art.

FIG. 1 shows a router blade 10 and a conventional bearing guide 12 in the shape of a circular disc. From the drawing it will be seen that the article 14 to be profiled forms a tangent to the circumference of the disc 12 and the area of contact between the disc 12 and the article 14 is relatively small. Such a bearing guide may leave a bearing imprint on the article 14 to be profiled possibly resulting in an inaccurate cutter profile and the time consuming job of sanding out the imprint.

Small gaps or imperfections may not be easily bridged by such a circular disc due to the small area of contact between the disc 12 and the article 14. The circular bearing guide will dip into such imperfections resulting in potential replacement or repair of the part being profiled.

Figure 2:
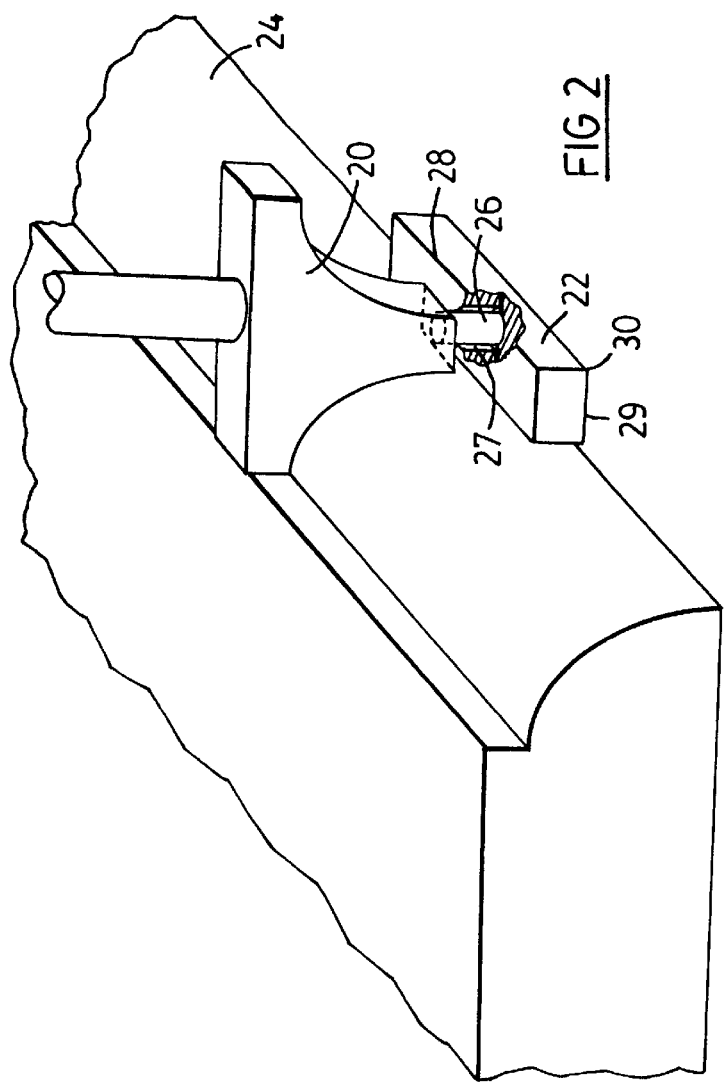
FIG. 2 shows a router blade according to the invention for profiling the edge of an article.

FIG. 2 shows a router blade 20 located in a rectangular bearing guide 22 according to the invention. The router blade 20 has an axial tip 26 located in a circular bearing socket 27 of the bearing guide 22. The circular bearing socket 27 is located centrally of the bearing guide 22. As shown, the router blade 20 is intended for profiling the edge of an article 24.

It will be seen from FIG. 2 that in this case the whole of the long edge of the rectangular bearing guide 22 bears against the edge of article 24 thus distributing pressure over a much larger area than the circular bearing guide of FIG. 1. It may therefore be less prone to leave marks on the article to be profiled and may more easily bridge minor gaps and imperfections then conventional prior art guides.

When the rectangular bearing guide is not in contact with the surface to be profiled it spins freely but come to a complete stop on contact with the surface.

When the article 24 to be profiled does not itself have a straight edge, for example when it is an outside radius of a curved object, there may, theoretically, be some instances where the whole of straight edge 28 does not bear against the edge of article 24 but, in practice, article 24 will be of much greater size than bearing guide 22 therefore, in practice, even when article 24 does not have a straight edge, the whole of straight edge 28 will effectively bear against it. Thus, when article 24 is the edge of a round table, even quite a small round table, although the edge is curved it is not significant in comparison with the length of straight edge 28.

The rectangular bearing guide 22 may, for example, have a thickness of 5 mm, a length along long edge 28 of 25 mm and a length along short edge 29 corresponding to the diameter of the router bit it is desired to use. Bearing socket 26 is located centrally of the block. The corners 30 of rectangular bearing guide 22 may be rounded to minimize risk of gouging the edge of the surface to be profiled. The bearing guide 2 is conveniently made from highly polished stainless steel, but other metals or composite materials may be used such as nylon or graphite.

I claim:

1. A router bit having a bearing guide, the router bit comprising a cutting edge and a depending bearing; and the bearing guide comprising a plate having a straight edge for location against an article to be cut by the router bit and having a bearing socket in a top surface thereof, the socket engaging the axial tip of the router bit and being spaced from the straight edge by a distance to locate the router bit in a desired cutting position.

2. A router bit as claimed in claim 1 in which the straight edge of the bearing guide plate merges smoothly with remaining periphery of said plate.

3. A router bit as claimed in claim 2 in which the bearing guide plate has a thickness of at least 5 mm.

4. A router bit as claimed in claim 2 in which the length of said straight edge of said bearing guide plate is at least 25 mm.

5. A router bit as claimed in claim 1 in which the bearing guide is a rectangular plate having a central bearing socket.

* * * * *

UNITED STATES PATENT AND TRADEMARK OFFICE
CERTIFICATE OF CORRECTION

PATENT NO. : 5,806,577
DATED     : September 15, 1998
INVENTOR(S) : Greg Durand

It is certified that error appears in the above-identified patent and that said Letters Patent is hereby corrected as shown below:

On the title page,

After " (60) Provisional application No. 60/"

Please insert -- 014,402, March 29,1996.--

Signed and Sealed this

Twenty-ninth Day of June, 1999

Attest:

Q. TODD DICKINSON

*Attesting Officer*  *Acting Commissioner of Patents and Trademarks*